United States Patent
Matheyka

(10) Patent No.: US 8,707,663 B2
(45) Date of Patent: Apr. 29, 2014

(54) APPARATUS FOR THE FILLING OF BAGS HAVING AT LEAST ONE OPENING THEREIN AND HAVING SPACE TO PERMIT DECREASED ACCUMULATION OF FILLING MATERIALS

(75) Inventor: Thomas Matheyka, Eppstein (DE)

(73) Assignee: KHS GmbH, Dortmund (DE)

( * ) Notice: Subject to any disclaimer, the term of this patent is extended or adjusted under 35 U.S.C. 154(b) by 329 days.

(21) Appl. No.: 12/342,440

(22) Filed: Dec. 23, 2008

(65) Prior Publication Data

US 2009/0320958 A1    Dec. 31, 2009

(30) Foreign Application Priority Data

Jun. 30, 2006 (DE) .......................... 10 2006 030 255

(51) Int. Cl.
*B65B 43/46* (2006.01)
*B65B 59/04* (2006.01)

(52) U.S. Cl.
CPC ............... *B65B 43/465* (2013.01); *B65B 59/04* (2013.01)
USPC ................... 53/570; 53/393; 141/86; 141/87; 141/88; 141/166

(58) Field of Classification Search
USPC ............. 53/570, 571, 384.1, 393; 141/86–88, 141/166, 313, 314
IPC ........................................................ B65B 59/04
See application file for complete search history.

(56) References Cited

U.S. PATENT DOCUMENTS

| | | | | |
|---|---|---|---|---|
| 1,385,498 | A | * | 7/1921 | Schaffer .......................... 141/314 |
| 2,524,908 | A | * | 10/1950 | Hartman et al. ............... 141/166 |
| 2,867,246 | A | * | 1/1959 | Busse ................ 141/86 |
| 3,054,239 | A | * | 9/1962 | Boyer et al. ..................... 53/570 |
| 3,091,903 | A | * | 6/1963 | Kammerer ....................... 53/570 |
| 3,147,780 | A | * | 9/1964 | Garriott et al. ................... 141/88 |
| 3,340,679 | A | * | 9/1967 | Johnson ............................ 53/570 |
| 3,364,940 | A | * | 1/1968 | Ginsburgh et al. ............ 141/227 |
| 3,416,620 | A | * | 12/1968 | McClusky ........................ 53/502 |
| RE26,553 | E | * | 3/1969 | Nutting et al. ................... 53/562 |
| 3,809,132 | A | * | 5/1974 | Jones ............................. 141/122 |
| 3,933,185 | A | * | 1/1976 | Seals ................................ 141/88 |
| 4,108,300 | A | * | 8/1978 | Hayase et al. ................... 53/570 |
| 4,137,689 | A | * | 2/1979 | McClusky et al. .............. 53/570 |

(Continued)

FOREIGN PATENT DOCUMENTS

| | | |
|---|---|---|
| DE | 19 15 555 | 10/1970 |
| DE | 697 00 644 | 2/2000 |

(Continued)

OTHER PUBLICATIONS

International Search Report PCT/EP2007/005402 and English translation thereof, Sep. 18, 2007.
International Preliminary Report on Patentability PCT/EP2007/005402 and English translation thereof, Sep. 18, 2007.
International Search Report PCT/EP2007/005399 and English translation thereof, Sep. 19, 2007.

*Primary Examiner* — Stephen F Gerrity
(74) *Attorney, Agent, or Firm* — Nils H. Ljungman & Associates

(57) ABSTRACT

An apparatus for the treatment of flexible, hose-like objects, such as bags, in which the processing devices are located on a guide track above the objects to be treated, which processing devices and guide track are suspended from a framework with an empty space underneath.

4 Claims, 8 Drawing Sheets

(56) References Cited

U.S. PATENT DOCUMENTS

| | | | | |
|---|---|---|---|---|
| 4,353,198 | A | * | 10/1982 | Koppe ............... 53/570 |
| 4,509,313 | A | * | 4/1985 | Koppe ............... 53/570 |
| 4,580,473 | A | * | 4/1986 | Seiden et al. ............ 83/23 |
| 4,960,156 | A | * | 10/1990 | Tribert ............... 141/86 |
| 5,862,653 | A | | 1/1999 | Solano |
| 6,050,061 | A | * | 4/2000 | Todd et al. ............ 53/455 |
| 6,170,238 | B1 | | 1/2001 | Lerner |
| 6,276,117 | B1 | | 8/2001 | Wiles |
| 6,295,790 | B1 | * | 10/2001 | McGregor et al. ........ 53/571 |
| 6,675,951 | B2 | | 1/2004 | Preti |
| 2003/0074866 | A1 | * | 4/2003 | Koppe ............... 53/459 |

FOREIGN PATENT DOCUMENTS

| | | |
|---|---|---|
| DE | 198 59 060 | 6/2000 |
| EP | 0 492 140 | 7/1992 |
| EP | 0 765 807 | 4/1997 |
| EP | 0 999 137 | 5/2000 |
| GB | 1 253 311 | 11/1971 |
| JP | 2004025153 | 1/2004 |

* cited by examiner

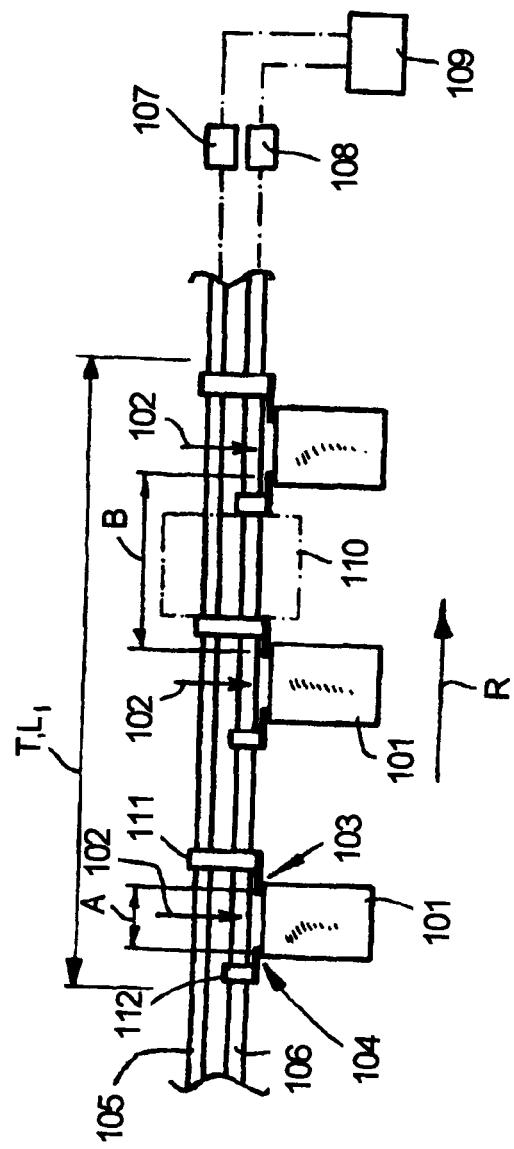

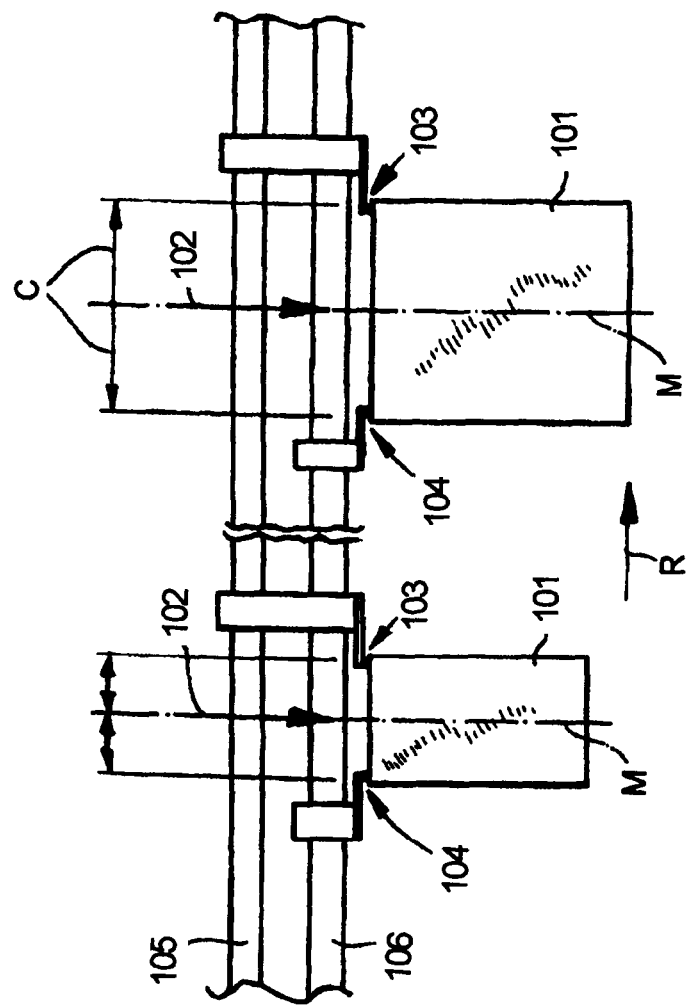

ABSTRACT FOR THE FILLING OF BAGS
HAVING AT LEAST ONE OPENING THEREIN
AND HAVING SPACE TO PERMIT
DECREASED ACCUMULATION OF FILLING
MATERIALS

CONTINUING APPLICATION DATA

This application is a Continuation-In-Part application of International Patent Application No. PCT/EP2007/005402, filed on Jun. 20, 2007, which claims priority from Federal Republic of Germany Patent Application No. 10 2006 030 255.9, filed on Jun. 30, 2006. International Patent Application No. PCT/EP2007/005402 was pending as of the filing date of this application. The United States was an elected state in International Patent Application No. PCT/EP2007/005402.

BACKGROUND

1. Technical Field

This present application relates to an apparatus for the filling of bags having at least one opening therein and having space to permit decreased accumulation of filling materials.

2. Background Information

Background information is for informational purposes only and does not necessarily admit that subsequently mentioned information and publications are prior art.

The bags or hose-like objects are conventionally formed objects that have at least one opening. Through this opening, grippers can be introduced into the hose-like object and brought into contact with, for example, the vertical edges of the object to fix it in position and transport it along the movement path. Of course other possibilities of transport are conceivable and are included in the teaching of the present application. Likewise, the present application is naturally not limited to the treatment of bags.

If bags are being processed, they have generally originated from material in the form of a flat sleeve, and are provided with the respective bag bottom by thermal sealing, ultrasound, gluing or similar processes. These flat sleeves can, for example coming off a roll, be separated by means of a respective separation step and are delivered to the processing device individually or in groups for purposes of additional processing. It goes without saying that it is also possible, within the teaching of the present application, to process prefabricated bags.

"Processing" within the meaning of this present application means all or most of the processes that modify the bag or the object and/or the product in it. Processing includes not only the simple filling of the bag in question, but also the installation of spouts, adapters and valves, as well as the additional shaping and contouring of the bag. Processing also includes the application of labels, hangars and hooks or slides. Finally, it also includes processes such as the internal or external gas-flashing of the bags with inert gas, their sterilization and optionally a vacuum cleaning.

It is frequently assumed that the bags, in the case which is described by way of example, are acted upon over at least a section of the processing device so that the equipment necessary or desired for the processing acts on the bags from below. In some systems, although the processing units are located above the movement path of the bags, the conveyors or guide tracks with which the bags are moved on their movement path through the machine or apparatus, i.e. functional components of these conveyors or guide tracks are located below the bags and possibly also below their filling openings. Among these systems, there are also systems in which the frameworks that support the conveyors or guide tracks are realized in the form of bridges, as a result of which then at least parts of these bridges are also located below the movement path of the bags.

During the operation of the apparatus, in spite of the exercise of the most extreme caution, it can happen that the product being packaged is splashed, spilled of simply dumped outside the bag. These spills are also unpleasant when the products in question are liquids, which can also still be sticky. As a result of such spills, intensive cleaning work has to be or should be performed. Such spills can also have an adverse effect on the operation of the apparatus. They also increase costs, which is one of the disadvantages this present application is designed to overcome.

The technical problem on which the present application is based is to develop an apparatus of this type for the treatment of flexible, hose-like objects, for example bags, so that contamination is reduced to a minimum and the overall operation of the apparatus is improved.

OBJECT OR OBJECTS

To accomplish this objective, the present application teaches that, on an apparatus of the general type described above, an open space is realized underneath the movement path of the objects, at least in the vicinity of a section of the movement path.

SUMMARY

In this open space, therefore, few or no parts are located underneath the movement path in question that could become contaminated, for example, by spills from the processing apparatus. These parts can also be components of a mechanical, pneumatic system or miscellaneous table-like or balcony-like projections.

The present application teaches that the open space must be realized or should be realized at least in the vicinity of the section in which the processing and/or dosing devices are located, although it goes without saying that it can also be extended to cover the entire length of the movement path. Otherwise, the open space in question does not prevent, restrict, and/or minimize the installation of a collecting device on the floor or underneath the open space.

Nor does the open space prevent, restrict and/or minimize the realization, at least on one side next to the movement path, of a backsplash or a splash plate, whereby in comparison to similar systems of the prior art a closed surface is formed that has few or no corners where dirt can collect, which makes the cleaning of the apparatus a fast and easy operation.

To realize the open space in question in detail, the framework that supports the at least one processing device on the section must or should be realized in the form of a bridge or bridge construction that spans the section in question. The bridge or the bridge construction holds both the processing apparatus in question as well as a guide track for the transport of the objects and positions all or most of these parts above the movement path of the objects, which is located underneath it.

The apparatus according to the present application is therefore characterized by a special bridge construction that extends over at least the section that comprises the processing apparatus. In fact, at this point, the framework is realized in the form of a bridge or has such a bridge, which for its part holds both the processing apparatus as well as the guide track for the transport of the objects, and in one possible embodiment all or most above the movement path of the objects, which is located underneath it. In this manner, the processing apparatus and the guide track are positioned above the movement path and consequently also above the objects, which for their part are generally transported in a suspended position below the guide track. For this purpose the guide track has at least one gripper per object. In one possible embodiment, a pair of grippers is realized on the guide track to hold each object.

The gripper or gripper pair for holding the objects are themselves connected to and suspended from the guide track, so that the bags automatically reach their intended position underneath the guide track and thus in the movement path and define the movement path. That is because the gripper or gripper pairs are generally engaged from above in the opening or filling opening of the individual bag, and hold the bag by contact with its respective vertical ends under tension, so that the processing can be carried out by means of the processing apparatus. The gripper or gripper pairs may also engage the bag on seams or portions of the sides of the bags proximate the opening therein. Of course, other potential ways of fastening the bag by means of the gripper are also conceivable, e.g., by means of clamps, suction devices, etc.

In one possible embodiment, the bridge or bridge construction rests on columns or bases that are outside the section. In at least one possible embodiment according to the present application, the bridge or bridge construction is oriented essentially horizontally, while the bases extend primarily vertically. The bridge, in connection with the bases, thereby overall forms a housing structure which is open on the bottom.

In one possible embodiment, the bridge and the guide track run parallel or virtually parallel to one another in position one above the other. The above mentioned bases are each located at some distance from the bridge and the guide track and are generally opposite one another in pairs with reference to the guide track or the movement path of the objects. In fact, the bridge and with it the guide track are generally placed on a mirror plane with reference to the pairs of bases which are located on each side.

The bases are consequently a component of the bridge structure which is open on the bottom and spans the section that comprises the processing apparatus or the section that comprises a plurality of processing devices. The bridge and the bases, as well as the guide track and consequently the movement path, thereby all or most run in the same direction, and in one possible embodiment in a longitudinal direction which is defined by the movement path. As a result of the symmetrical arrangement of the bases with reference to the movement path, the bridge and the guide track, the bases are placed at a specified transverse distance on both sides of the movement path. Generally the structure is also designed with a specified longitudinal distance between the respective bases, whereby the respective longitudinal distances and transverse distances are in one possible embodiment equal, to simplify the manufacture of the structure.

To increase the stability, the structure also has horizontal struts which connect the base pairs, which are essentially oriented vertically, with one another. The bridge is suspended on these horizontal struts and thereby creates the connection of each of the arches formed by the base pairs and the horizontal struts that connect them with one another.

Because the objects or bags are generally transported along the movement path, at least in the vicinity of the section, suspended from the gripper pairs, and therefore above the guide track, the processing apparatus and the bridge that supports the two above mentioned elements are located above the bags, the desired open space can be automatically defined below the movement path of the objects, at least in the vicinity of the section.

The above mentioned collecting device can be placed on the floor or underneath the open space. By means of this collecting device it is possible, for example, to collect excess or spilled product, dust, splashed liquid, etc. The space available underneath the collecting device therefore remains practically free of dirt or contamination and the collecting device can also be cleaned easily by folding it down or out.

Additionally, in one possible embodiment according to the present application, the installation of drains and/or drain ducts on or in the collecting device improves or promotes the cleaning action.

Consequently, at least one possible embodiment according to the present application is an apparatus for the treatment of flexible, hose-like objects, in one possible embodiment of bags, which at least in the vicinity of a section of their movement path has an open space that extends underneath the movement path. In addition, at least in the vicinity of the section of the movement path there is a bridge that spans the section in question in the form of a component of a housing structure that is open on the bottom. In this manner and according to at least one embodiment of the present application, the open space is provided automatically underneath the objects or bags or underneath the movement path, below which the collecting device is positioned. Consequently the cleaning time is significantly reduced and the useful life of the apparatus is increased, which achieves a significant cost advantage.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below on the basis of possible embodiment which are illustrated in the accompanying drawings, in which:

FIG. 4 shows a side view of the device, partly in detail;

FIG. 5 shows a side view during a bag change; and

DESCRIPTION OF EMBODIMENT OR EMBODIMENTS

Figure 1:
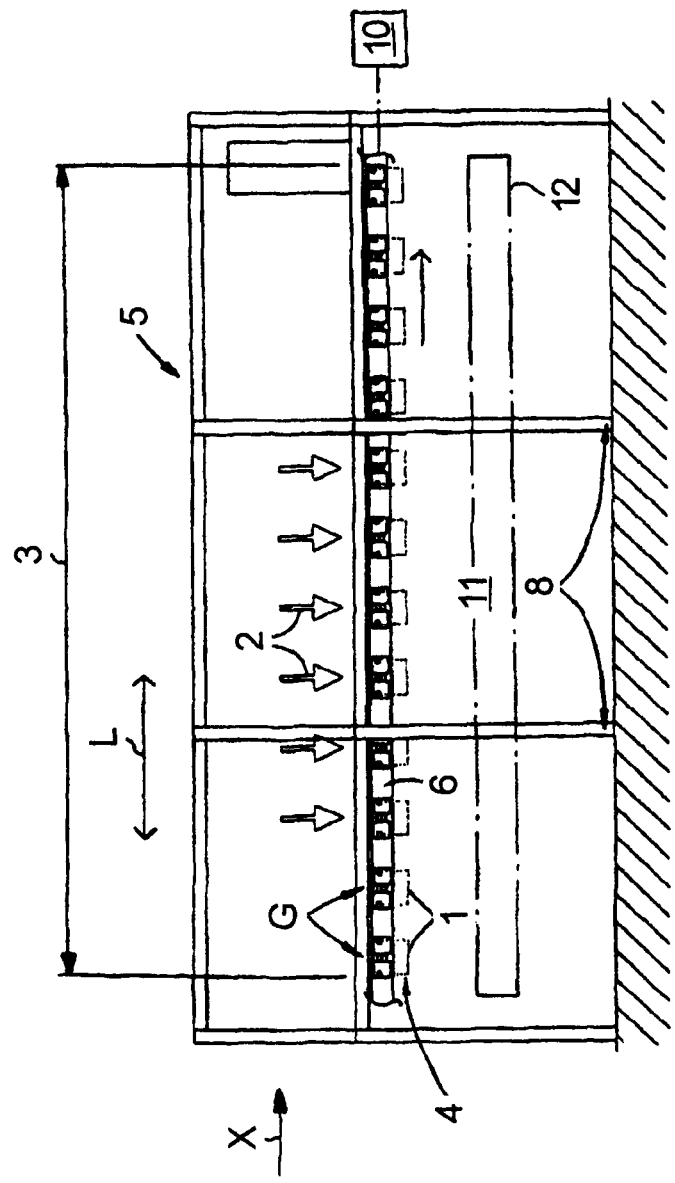
FIG. 1 shows the apparatus in a schematic side view.

The figures show an apparatus for the treatment of flexible, hose-like structures with at least one opening. These objects are not limited to bags 1. The bags 1 are moved through the above mentioned apparatus along the transport path indicated by the arrow in FIG. 1 or in the longitudinal direction L, and during this process are acted upon by a plurality of processing devices 2. These processing devices 2 are individual dispensers or dispensing device, which, in the illustrated embodiment, dispense measured amounts of the different ingredients of a premixed soup into the bags 1 that pass underneath them or into the filling opening of the bags. Of course, entirely different types of processing can also be performed, as described in the introductory portion of the description of the present application. The processing devices 2 are located on a section 3, for example of a more or less circular movement path 4. The processing devices 2 act upon section 3 of the objects or bags 1. The bags 1 define the movement path 4 during their transport.

To hold the processing apparatus 2 and the movement path 4, a framework 5 is provided, which is realized in this case in the form of a bridge or bridge construction 5 which spans at least the section 3. The framework or the bridge 5 holds both the processing devices 2 as well as a guide track 6 for the transport of the objects. The guide track 6, together with the bags 1, defines the movement path 4 along which the bags 1 are guided through the apparatus (in a circuit).

By means of the framework and/or of the bridge 5, the processing devices 2 and the guide track 6 are positioned above the movement path 4 of the objects or bags 1 which are below it. In fact, in the illustrated embodiment, although the present application is by no means limited to the features of the illustrated embodiment, connected to the guide track 6 is a gripper pair G, each of which holds a bag 1, and in one possible embodiment in the suspended position. The grippers that are part of the gripper pair G are inserted, for example, into the opening of the respective filling opening of the individual bag 1 and hold the bag in the desired position. In this manner, it is automatically essentially ensured or promoted that the movement path 4 is located underneath the guide track 6, which is in turn located underneath the bridge 5.

Both the bridge 5 and the bases 7 that support the bridge 5 are oriented in the same direction, and in one possible embodiment in the longitudinal direction L defined by the movement path 4, whereby the longitudinal direction L coincides with the transport direction of the bags 1 and consequently the movement path 4. The bases 7 in question are positioned outside the section 3. In fact, base pairs 8, each comprising two bases 7, are located on both sides of the movement path 4 at equal transverse distances from each other.

The bases 7 and the base pairs 8 respectively are also located at specified and, in the illustrated embodiment, equal longitudinal distances from each other in the longitudinal direction L. To connect the bases 7, there are horizontal struts 9. Each base pair 8, together with the horizontal struts 9 that connect the bases 7, forms a roof-like arch 8, 9. The arches 8, 9 and base pairs 8 are connected with one another in the longitudinal direction L by the bridge 5. In this manner, the bases 7 are components of a housing structure 5, 7, 8, 9 which spans the section 3 and is open on the bottom.

Because the relevant units, i.e. the processing devices 2 and the guide track 6, are located above the movement path 4 for the bags 1, which is also true for any motors 10 used for the drive of the guide track 4, an open space 11 is defined underneath the movement path 4 of the bags 1. A collecting device 12 is also located below this open space 11 and consequently also underneath the movement path 4. This catching device 12 collects any dust, splashed products, etc. The catching device 12 can be pivoted if necessary or desired and easily cleaned, and for this purpose is connected to the housing framework 5, 7, 8, 9 and/or a base 7 by means of a pivot bearing 13.

Figure 2:
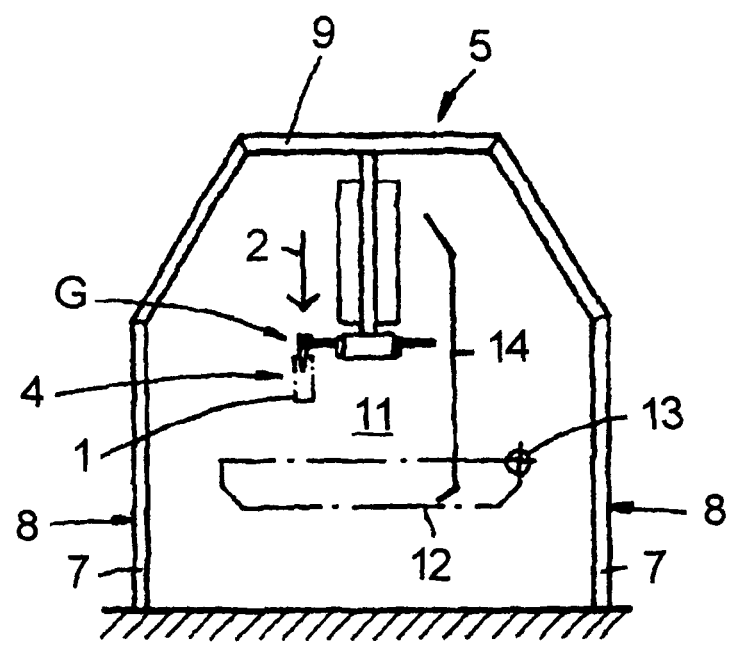
FIG. 2 shows a head-on view of the object of the present application figured in FIG. 1, from direction X.
Figure 2A:
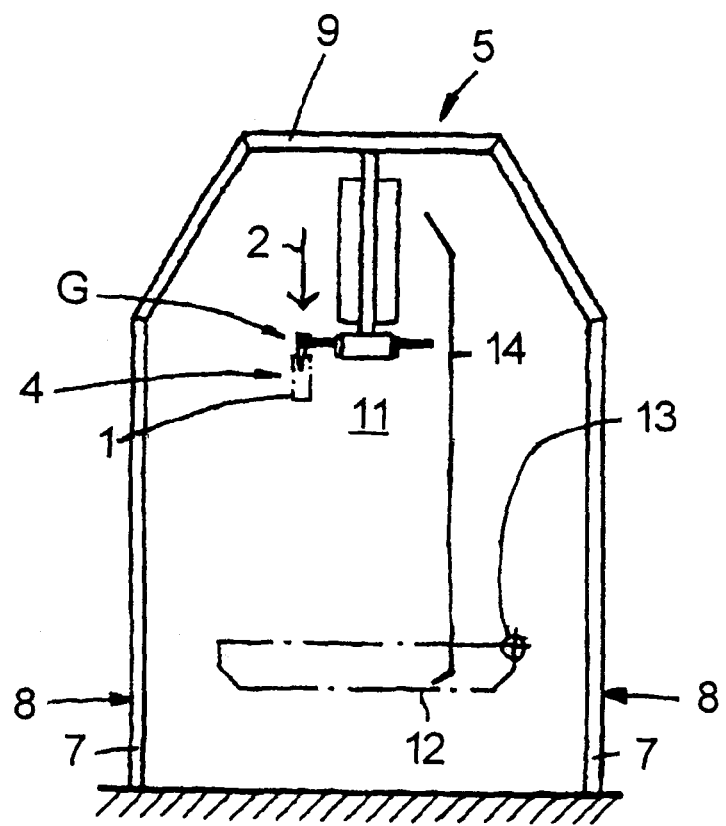
FIG. 2A shows a head-on view of an apparatus for filling bags with an extended frame portion.

FIG. 2A shows an apparatus for filling bags with an extended frame portion. The bases 7 and the base pairs 8 respectively are vertically extended, in the illustrated embodiment. The horizontal bridge 5 comprising horizontal struts 9 are thus elevated from a floor area. In this manner, the filling devices 2 and the guide track or conveying and disposing arrangement 6, are located further above a floor area which the filling apparatus rests. Open space 11, defined underneath the movement path 4 of the bags 1, is vertically expanded. Collecting device 12, located below open space 11, may be pivoted about pivot bearing 13 without impinging conveying and disposing arrangement 6 and filling devices 2. Therefore, cleaning of collecting device 12 is accomplished with the removal of backsplash 14, if incorporated into the filling apparatus, and pivoted upward about pivot bearing 13.

The figures show a device for the treatment of flexible, tubular structures with at least one opening that in this embodiment is suitable for the treatment of bags 101, but is not restricted thereto. Processing of the bags 101 means, for example, filling them by means of a metering device 102. Alternatively or in addition, this could also mean the application of labels, an overprint, contours, the application or attachment of spouts, adapters, valves, etc.

The basic configuration of the device comprises at least one gripper pair 103, 104, having a leading gripper 103 and a trailing gripper 104. One sees that the possible embodiment includes a plurality of leading grippers 103 and trailing grippers 104. Each bag 101 is secured and transported with the help of the associated gripper pair 103, 104. The gripper pair 103, 104 holds the bag 101 in question at its opening or fill opening.

In one possible embodiment according to the present application, the leading gripper or grippers 103 and the trailing gripper or grippers 104 are mounted on different guide trains or gripper trains 105, 106, which can be moved relative to one another. In fact, all are most of the leading grippers 103 are mounted on a leading gripper train 105, whereas, by way of exception, the trailing grippers 104 are mounted on a trailing gripper train 106 for the two guide trains or gripper trains 105, 106.

One sees that the leading grippers 103 in the direction of transport or direction of motion R of each gripper pair 103, 104 assumes a leading position, whereas the trailing grippers 104-as the name suggests-trail. So that the two guide trains 105, 106 can be moved or displaced relative to one another, the guide trains 105, 106 are equipped with separate motorized drives 107, 108, which can be impinged independently of one another and are suggested in the figures. Of course, it is also within the scope of the present application to also work with one drive as long as this permits the independent impingement of the leading gripper train 105 on the one hand and the trailing gripper train 106 on the other.

The motorized drive 107 is a leading gripper train drive 107, which acts on the leading gripper train 105, whereas motorized drive 108 is configured as a trailing gripper train drive 108 and impinges the trailing gripper train 106. Both the leading gripper train drive 107 and the trailing gripper train drive 108 are realized in the embodiment as, but are not restricted to, electronic servomotors and are connected to a common controller 109.

Both guide trains 105, 106, are in the form of an endless loop, which in the possible embodiment has the form of an elongated circle. The path of motion in direction R defined in this manner by the two guide trains or gripper trains 105, 106 is linear over at least one segment T of defined length $L_1$. Indeed, this segment T of the defined length $L_1$ allows for the number of metering devices 102 in this example, each of which is arranged in a fixed location.

So that the metering devices 102 and the associated processing points can fill the bags 101 without problems, it must or should be essentially ensured or promoted that the middle M of each bag or the center plane of the bag is positioned exactly or virtually exactly or generally below or above the metering devices 102 arranged along the path of motion as the bags circulate. By doing so, the bag 101 in this example can be processed or filled without problems even if bags 101 of different sizes, variable shapes or which otherwise differ from one another are to be treated.

Figure 3:
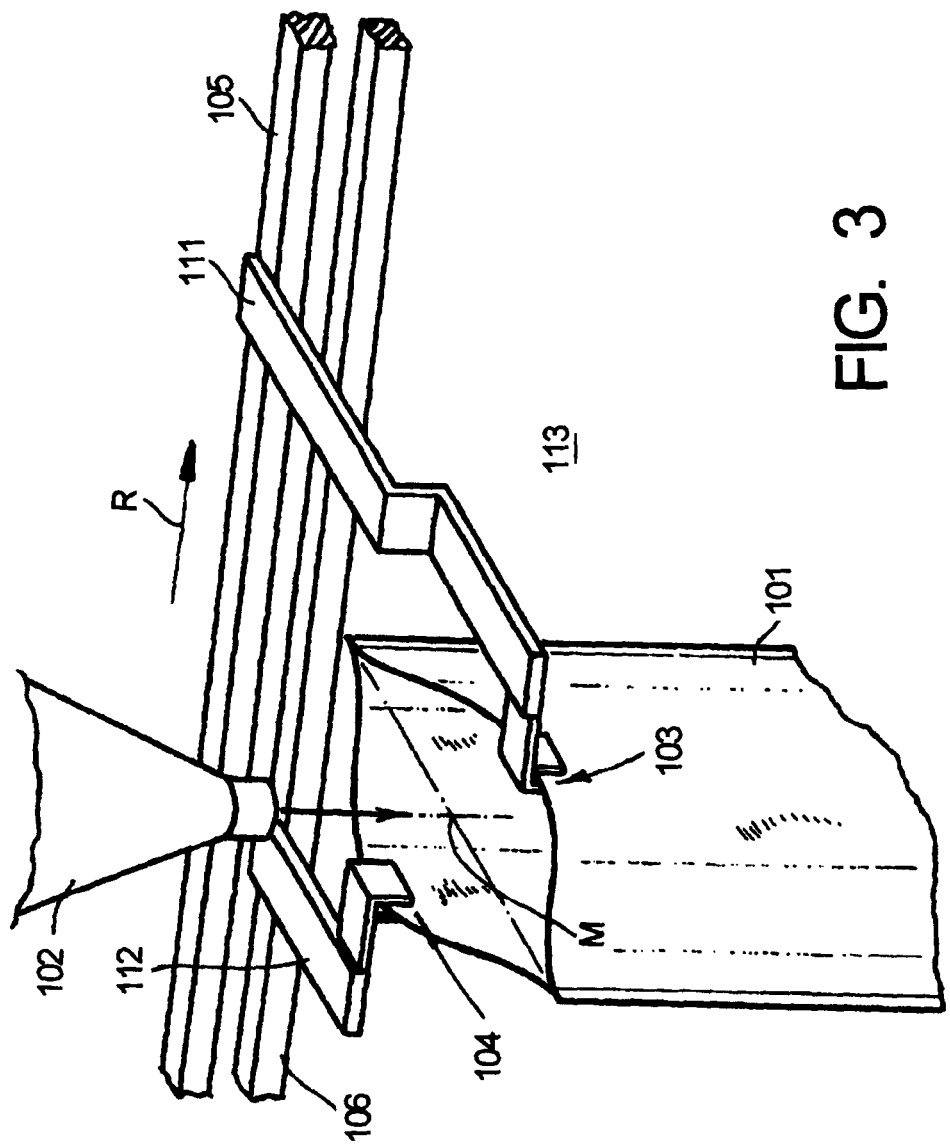
FIG. 3 shows as perspective view of one section of the device according to the present application.
Figure 3A:
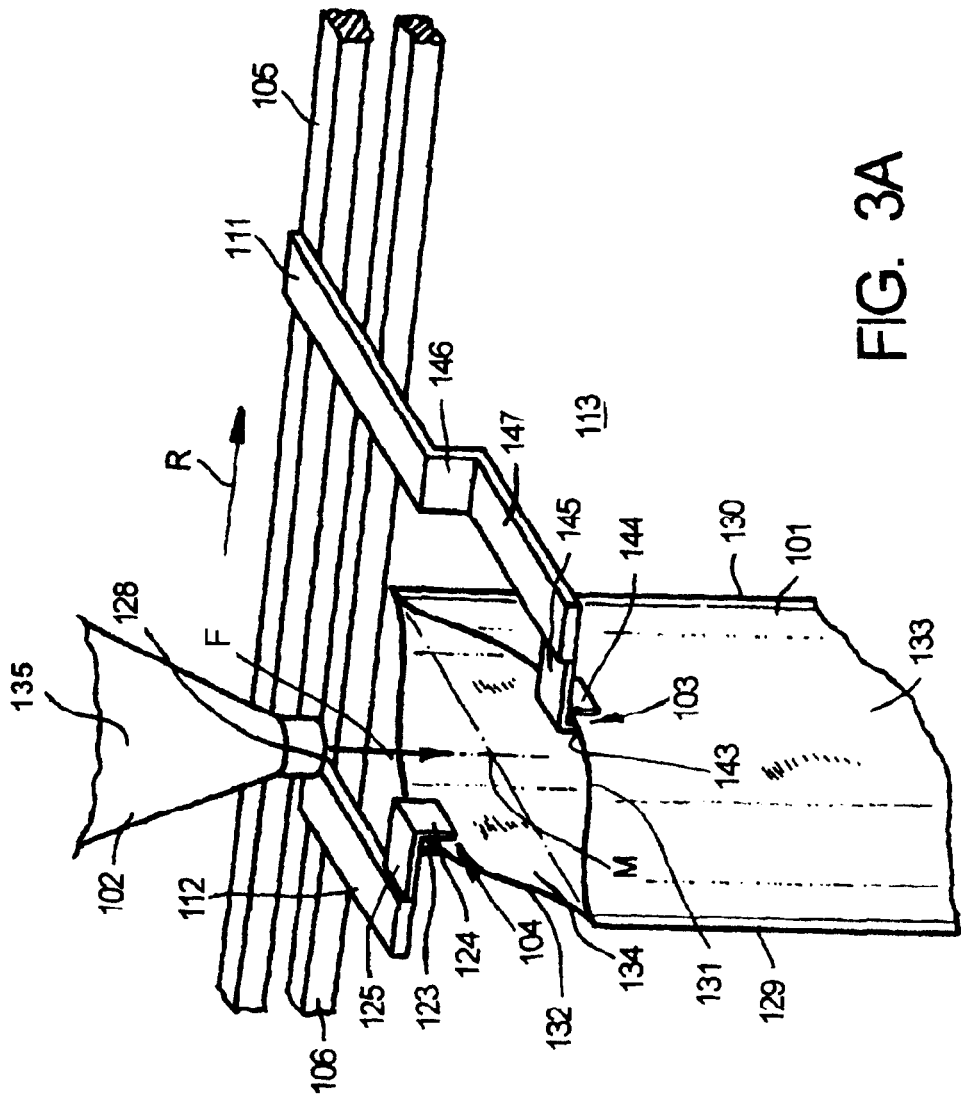
FIG. 3A shows detail references of the perspective view of the section of the device shown in FIG. 3.

As shown in FIG. 3A, metering device 102 comprises an upper material holding portion 135, having a funnel configuration in the embodiment shown, and a lower exiting portion 128 depending downward from material holding portion 135. Bags 101 are disposed with grippers 103 and 104 with the middle M of the opening in bag 101 substantially below exiting portion 128. The materials being metered into bag 101 may flow through lower exiting portion 128 by gravity into middle M of bag 101 as shown by material flow.

One sees that the two guide trains or gripper trains 105, 106 are arranged or run one above the other when viewed from the side and define the path of motion in question. The two guide trains 105, 106 can include one or more conveying devices such as belts, chains, etc., which are not expressly shown and can also be used in combination. The leading grippers 103 and the trailing grippers 104 are mounted separately and independently on the said conveying devices; in one possible embodiment, the leading grippers 103 on the conveying device of the leading gripper train 105 and the trailing grippers 104 on the respective conveying device of the trailing gripper train 106.

With the help of the controller 109, the distance A between the two grippers 103, 104 can be varied, e.g. in that the leading gripper train drive 107 impinges the leading gripper train 105 while the trailing gripper train 106 remains stationary. It is also possible to vary a distance B between the gripper pairs 103, 104. This distance B between the gripper pairs 103, 104 is also called the gripper pair gauge. By impinging the leading gripper train drive 107 on the one hand and the trailing gripper train drive 108 on the other, the controller can vary both the distance A between the grippers 103, 104 and the distance B between the gripper pairs 103, 104, or the gripper gauge, as a function of the size of the bag 101 to be processed in the example and the number of components desired, and thus the number of metering devices 102 for filling the bag 101.

In the event of a bag change, as long as the bags 101 are mirror-symmetric relative to a plane of symmetry running through the middle M of the bag (which is often the case), the controller 109 essentially ensures or promotes that the respective leading gripper 103 is shifted by a defined amount C in the direction of transport R, for example, and the corresponding trailing grippers 104 are moved by the same amount C in the direction opposite the direction of transport R. By means of this quasi symmetrical shift by the same amount C, the middle M of the bag retains its same position even in the event of a bag change, as is clearly illustrated in FIG. 5 for different bags 101 or for the case of a bag change.

Thus a bag change is performed more or less at the push of a button, in that the corresponding processing distances A and/or B for the respective bag 101 are queried in the controller and result in a corresponding actuation of the motors or drives 107, 108. In an embodiment, distances A and/or B may be changed with one or at least one motor arrangement. A motor arrangement may comprise a motor and one or more clutch arrangements, rods, cams, or other devices to change distances A and/or B. As is suggested in FIG. 4, the gripper pair gauge can also be modified by the insertion of corresponding spacers. This means that the distances A and/or B can be adjusted both by motor and manually. This accounts for bags 101 of different shapes in the event of a bag change, and also essentially ensures or promotes that the position of the middles M of the bags relative to the guide trains 105, 106 and thus to the metering devices 102 remains unchanged.

The grippers 103, 104 are mounted on mounting plates 111, 112, which are best seen in FIG. 3. The leading mounting plates 111 holding the leading grippers 102 are logically mounted on the leading gripper train 105. On the other hand, the trailing mounting plates 112 are mounted on the trailing gripper train 106. This can be done by bolting, riveting, etc. The grippers 103, 104 themselves are non-permanently attached to, and in this example suspended from, the respective guide trains or gripper trains 105, 106 or their associated mounting plates 111, 112.

The leading grippers 103 are mounted on conveying device 105 and the trailing grippers 104 are mounted separately and independently on conveying device 106 as shown in FIG. 3A. Specifically, grippers 103 are comprised of a leading jaw 124 and a trailing jaw 123 depending from a base 125. Grippers 104 are comprised of a leading jaw 144 and a trailing jaw 143 depending from a base 145. Base 125 is connected to gripper train 106 with mounting plate 112. Base 145 is connected to gripper train 105 such that bases 125 and 145 are positioned at a similar vertical height. Mounting plate 111 is connected to gripper train 105 and extends horizontally therefrom. Downwardly extending arm 146 connects horizontally extending arm 147 to mounting plate 111. Base 145 extends from extending arm 147 toward base 125.

Leading jaw 124 and/or trailing jaw 123 may be movable with respect to one another such that gripper 104 operates to grip bag 101 proximate trailing upper edge 132. The jaw(s) 123 and/or 124 may be moved with an electro mechanical motor or electronic servomotor and may be controlled with controller 109. Grippers 103 and 104 may be electromagnetic and/or may have one or more cams to effectuate gripping. Leading jaw 144 and/or trailing jaw 143 may be movable with respect to one another such that gripper 103 operates to grip bag 101 proximate leading upper edge 131. The jaw(s) 143 and/or 144 may be moved with an electro mechanical motor and may be controlled with controller 109. However, leading jaw 124 and trailing jaw 123 may be biased toward one another wherein trailing side wall 134 of bag 101 may have upper edge 132 inserted therebetween. In a like manner, leading jaw 144 and trailing jaw 143 may be biased toward one another wherein leading side wall 133 of bag 101 may have upper edge 131 inserted therebetween. Such biasing may eliminate a need for a motor to grip bags 101. Jaws 123 and 124 of gripper 104 may have a throw or distance therebetween when separated to receive a portion of bag 101 to incorporate a tolerance in the position of edge 132 and jaws 143 and 144 of gripper 103 may have a throw or distance therebetween when separated to receive a portion of bag 101 to incorporate a tolerance in the position of edge 131. It is to be understood that grippers 103 and 104 may be configured to grip edges 131 and 132, respectively as shown in FIG. 3A, and may also be configured to grip bag 101 proximate seams 129 and 130. Alternatively, bag 101 may not have seams 129 or 130. Other and different grippers, as are known in the art, may be incorporated in embodiments of the present application.

Figure 6:
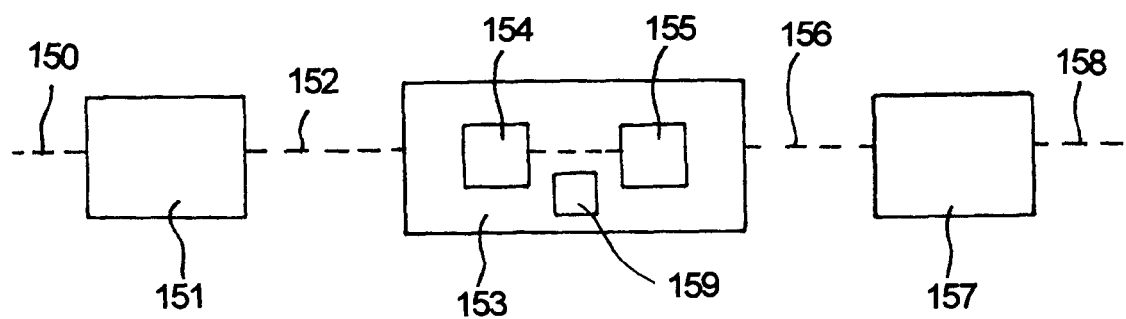
FIG. 6 is a block diagram showing a device according to the present application.

For example, in an embodiment, grippers 103 and 104 such as those disclosed FIG. 6 of U.S. Pat. No. 4,108,300, incorporated herein by reference in its entirety, may be incorporated into embodiments of the present application. As shown in FIG. 6 therein, "the bag gripping claws 11 are composed of parts 11a to 11g. A movable claw 11a moves about a pin lid against a resilient force of a compression spring 11c, and a fixed claw 11b is fixedly mounted on a slide block 11f together with a roller 11g by means of a bolt 11e. The slide block 11f is slidably supported on a rod-shaped attachment 13 of the chain conveyor 12. The empty bag 1 is gripped between the movable claw 11a and the fixed claw 11b by the resilient force of the compression spring 11c. Reference numerals 14 and 15 designate rails for guiding the chain conveyors 12, and numerals 16 and 17 designate guide rails for guiding the roller 11g. A pusher device 18 moves the gripping claws 11 in accordance with the geometrical decrease of the size W of the bag in FIG. 2 which occurs when the top mouth of the empty bag 1 is opened. The pusher device 18 moves the gripping claws 11 by moving the roller 11g and is integrally formed with a regulating table 19 which is integral with the rail 15. The piston rod of the pusher device 18 is adapted to be guided by the rail 15." U.S. Pat. No. 4,108,300, column 2, lines 35 through 54.

Gripper 103 may be mounted to a base 125 and may comprise a leading jaw 123 and a trailing jaw 124. Gripper 104 may be mounted to a base 145 and may comprise a leading jaw 144 and a trailing jaw 143. One or both of the leading and trailing jaws may be biased toward each other.

In a possible embodiment, grippers 103 and 104 may have a configuration as disclosed U.S. Pat. No. 6,276,117, incorporated herein in its entirety. "Referring in greater detail to the clamps 60, 62 of the preferred embodiment with reference to FIGS. 13 through 15 illustrating an exemplary trailing clamp, it is seen that the trailing clamp includes a base 100 that mounts to the posts 94. The base 100 carries a pair of jaws 102, 104 which are pivotable relative to the base 100, via an arm 106. The jaws 102, 104 are pivotable relative to each other and biased towards each other by a spring clip 108 surrounding the jaws 102, 104. The movement of the jaws 102, 104 is controlled by two followers 110, 112 which are adapted to engage surfaces for actuating and controlling the position of the jaws 102, 104. A coil spring 114 biases the arm 106 towards a rest position. The inside jaw 102 is fixed to the arm 106 while the outside jaw 104 is movable with respect thereto. Upon proper actuation of the first follower 110, the outside jaw 104 is urged away from the inside jaw 102 against the action of the spring clip 108 such that the jaws 102, 104 are opened to a pick position as shown in FIG. 16 to receive an edge of a pouch therein. The pick position is utilized at the pick station 34 (FIGS. 5 through 9) to pick new unfilled pouches from a pouch supply. Once the edge of the pouch is between the opened jaws 102, 104, the first follower 110 is released to allow the spring clip 108 to close the jaws 102, 104 and pinch the pouch edge therebetween. At this point the pouch is closed. To assist in opening the pouch by providing slack in the pouch, the second follower 112 is actuated against the action of the coil spring 114 which pushes the arm 106 and the pair of jaws 102, 104 forward toward the leading clamp 60 as shown in FIG. 17. This shortens the distance between leading and trailing clamps 60, 62 and provides sufficient slack in the pouch such that the pouch remains open for filling operations (see reference number 36 in FIG. 5). Turning to further details of the leading clamp 60, it includes a base member 120 mounted to the mounting posts 94. The base member 120 projects beyond the periphery of the chain guides 76, 78 to support an upright arm 122 which projects vertically to the elevation at which the jaws 102, 104 of the trailing clamp 62 are located. Near the top end of the arm 122 at a similar elevation as the jaws 102 104, resilient clips 124 are provided which are adapted to be opened to receive an edge of a pouch and closed to pinch the pouch in order to hold the edge of the pouch. The leading clamp 60 works cooperatively with the trailing clamp 62 to support a pouch." U.S. Pat. No. 6,276,117, column 7, lines 6 through 49.

Comparing FIG. 3 and FIG. 5, one recognizes that the two grippers 103, 104 are on the same side, the processing side 113, relative to the path of motion defined by the guide trains or gripper trains 105, 106. In this way the metering devices 102 can be arranged linearly and in series one behind the other above the path of motion on this processing side 113, and the guide trains 105, 106 are largely protected against any fouling during metering. The linear course of the path of motion in the affected segment T also facilitates this arrangement. In fact, the metering devices 102 and the guide trains 105, 106 are aligned and in parallel or are aligned virtually parallel to one another, at least in this segment T.

Finally, FIG. 4 suggests that the two guide trains or gripper trains 105, 106 with the associated frame can be assembled modularly and consequently can be made up of various modules. This makes it possible to adapt the length and configuration of the device described to vastly different requirements. This includes the option of providing another, third train not shown here either above or below the two guide trains or gripper trains 105, 106. This third guide train or gripper train can be equipped with multiple pairs of dual grippers, so that two bags 101 can be processed simultaneously or substantially simultaneously. Of course, it also lies within the scope of the present application to place additional guide trains with corresponding grippers 103, 104 either above or below the two guide trains 105, 106, either as alternatives or as supplements.

Bag 101 may have seams 129 and 130 between panels 133 and 134 and may have a seam at the bottom between panels 133 and 134. Bag 101 may be tubular and may be without seams. Bag 101 may have only one seam or may have any plurality of seams. Bag 101 has an open top and at least substantially closed sides and bottom. Bag 101 may be comprised of a clear, see through, or opaque plastic material, a metallized material, or other materials as are known in the art for containing fill materials such as bulk goods.

Prior to bag 101 being gripped with grippers 103 and 104, whether being gripped proximate seams 129 and 130, between seams 129 and 130, or at other portions of bag 101, bag 101 needs to be opened. Bag 101 is opened with an apparatus configured to open bags as in known by one of ordinary skill in the art. For example, in one embodiment, bags 101 may be opened with an apparatus similar to that disclosed in FIG. 4 of U.S. Pat. No. 4,108,300. "Reference numerals 20, 20 designate vacuum suction cups for opening the top of the bag 1 for purpose of charging the bag 1 with the contents. The vacuum suction cups are mounted on levers 21, 21, which are in turn rockable about a fulcrum on a support shaft 22 in accordance with the opening state of the bag 1. The support shaft 22 is supported from the main body 8 in a vertically slidable manner, and the vacuum suction cups 20 are so composed that the vertical movement and the bag opening operation may be effected thereby. The gripping claws 11 are mounted on the rod-shaped attachment 13 of the chain conveyor 12 at a fixed pitch, and the chain conveyor 12 is conveyed by a drive sprocket 23 in the direction of advance as indicated by an arrow in FIG. 3, the conveying distance (one pitch being equal to P (FIG. 3)). The movement of the chain conveyors 12 is intermittent, and in the illustrated positions they are stopped. The drive sprocket 23 is rotated through a shaft 25 by an indexing device 24, while the input shaft of the indexing device 24 is connected via coupling means 27 to a power source such as a motor 26 or the like supported from the main body frame. U.S. Pat. No. 4,108,300, column 2, line 55 through column 3, line 8.

In an embodiment, the opening of bag 101 may be processed with a device similar to that disclosed in U.S. Pat. No. 6,276,117. "FIGS. 5 through 6 schematically illustrating the preferred embodiment, the endless carrier 28 generally picks up newly formed or otherwise supplied pouches at a pick station 34, opens the pouches at an opening station 35 (which includes a clamp distance shortening station 36 and a wedge forming station 37), fills the pouches with the desired material at a fill station 38, seals or otherwise closes the pouches at a closing station 39, seals the pouches at a seal station 40 and drops off the sealed and filled pouches at a drop station 42." U.S. Pat. No. 6,276,117, column 4, lines 33 through 42. "To also maintain high rates of production, the sequence or configuration of the stations may also be changed. For example, vacuum machinery which pulls the sides of the pouches at the filling station 38 may be removed and replaced with a wedge opening station 37 located upstream of the filling station. A partly schematic illustration of the machinery used at the wedge opening station 37 is shown in FIG. 20. The machinery includes a bracket 156 which mounts on the support frame 26 that carries a wedge carriage 158 which includes a wedge 160 for forming a pocket in the pouch 22 prior to filling as schematically indicated by reference numeral 37 in FIG. 5. The carriage 158 is slidable and linearly translatable on guide rods 162 to move into and out of pouches. The carriage 158 is driven by the cycle shaft 33 in a conventional cycle such that the wedge 160 is driven into the pouch during the dwell time to form an opening or pocket therein. By eliminating the vacuuming step at the fill station 38, the minimum required dwell time is reduced thereby allowing for an increase in packaging production." U.S. Pat. No. 6,276,117, column 9, lines 3 through 21.

An embodiment of an apparatus for filling bags as disclosed herein may comprise a first guide train 105 and a second guide train 106, each having a portion movable in a substantially parallel orientation. A first gripper 103 is disposed with the first guide train 105 and a second gripper 104 is disposed with the second guide train 106. Prior to bags 101 being gripped with grippers 103 and 104, they are opened and disposed for gripping. For example, a continuous roll of bags 101 may be unrolled, cut to separate into individual bags 101, opened, and placed with a portion between each pair of jaws of grippers 103 and 104. The bags may be opened by any means as is known in the art. For example, in an embodiment wherein bags 101 have seams 129 and 130, bags 101 may be gripped proximate seams 129 and 130 and moved together. The opening may be enhanced by blowing air into the opening of bag 101, using vacuum grippers on the sides of bag 101, or by inserting a wedge into bag 101. In an embodiment wherein bags 101 do not have seams, opening may be effectuated with vacuum, for example. The open bags 101 may then be positioned within grippers 103 and 104 for gripping with an arrangement configured to position bags 101 for gripping with grippers 103 and 104.

In an embodiment, jaws 123 and 124 of gripper 104 and jaws 143 and 144 of gripper 103 are separated by a sufficient throw or distance to incorporate tolerances in the positions of portions of bags 101 to be gripped. For example, jaw 123 of gripper 104 and jaw 143 of gripper 103 may both be extended by an amount such jaws 123 and 143 are proximate with the middle of the opening M of bag 101. At the same time, jaw 124 of gripper 104 and jaw 144 of gripper 103 are moved in a direction away from the middle of the opening M of bag 101.

An embodiment having an arrangement configured to position bags 101 may be incorporated with guide trains 105 and 106 or may be a separate arrangement. For example, the apparatus shown in FIG. 3 of U.S. Pat. No. 6,276,117 may open bags 1 and position a portion between jaws 23 and 24 and another portion between jaws 43 and 44. Each gripper 60 and 62 shown in FIG. 4 of U.S. Pat. No. 6,276,117 may be disposed with an extending arm 122. The extension of arms 122 may position a portion of bags 1 between jaws 23 and 24 and another portion between jaws 43 and 44. Bags 1 may be positioned within grippers 3 and 4 having an opening orthogonal, parallel, or oblique with the direction R of guide trains 5 and 6.

The positioning of the portions of bag 101 to be gripped with grippers 103 and 104, whether the portions be seams 129 and 130, upper edges 131 and 132, or portions of panels 133 and 134, may be detected with sensors, such as optical sensors. In at least one embodiment, optical sensors may detect the opening of bags 101, the positioning of portions of bag 101, the gripping of bags 101, and/or positioning of the middle M with respect to metering device 102 of bags 101. The data gathered by the optical sensors may be relayed to controller 109. Controller 109 may then relay commands to change positioning of bag 101, discard bag 101, suspend metering and/or change other or different processing parameters.

FIG. 6 shows a block diagram of at least one embodiment of the present application. Flexibly sided containers are fed at 150 to an arrangement 151 configured to open and dispose flexibly sided containers. Arrangement 151 may have grippers or may have vacuum or suction apparatuses, or may use other means as are known in the art to open and dispose flexibly sided containers for gripping. Arrangement 151 may be a part of filling apparatus 153 or may be a separate apparatus. Flexibly sided containers are fed at 152 to a filling station 153. Filling station 153 is configured to fill flexibly sided containers by first gripping and then disposing the flexibly sided containers under a filling apparatus. Gripping arrangements 154 are opened and closed to grip portions of flexibly sided containers with an activating device 155 configured to open and close the gripping arrangements 154. Activating device 155 may comprise one or more electromagnetic motors, cams, rods, or other devices as are known in the art to move the jaws of the grippers of gripping arrangements 154 together for gripping and apart for releasing portions of flexibly sided containers. For example, each jaw of a gripper, each gripper, each pair of grippers, or a plurality of pairs of grippers may have an electromagnetic motor in communication therewith to effectuate gripping and releasing of flexibly sided bags with gripping arrangements 154. The flexibly sided containers are gripped and opened with gripping arrangements 154 and moved under a filling apparatus where they are filled with filling materials. The filling materials may include food items such as candies, for example gummy bears or jelly beans, snack items, for example pretzels or potato chips, or other food items. However, the flexibly sided containers may be filled with any liquid or solid materials such as bulk goods. The flexibly sided containers may be moved with one or more conveying arrangements. The conveying arrangements may be linear or in a loop configuration. The conveying arrangements may be moved with one or more motor arrangements 159. After filling, the flexibly sided containers are moved from filling station 153 at 156 where they may be further processed, for example closed, labeled, etc., at processing station 157. For example, the flexibly sided containers may be reclosable bags that are closed with the application of pressure to each side of the closing structure at processing station 157. In an embodiment, the flexibly sided bags may be welded shut with the application of heat or otherwise thermally sealed, ultrasonically bonded, or otherwise closed by other means as is known in the art. For example, flexibly sided containers may be closed with an apparatus such as the device disclosed in United States Patent Application No. 2007/0101684, incorporated herein by reference in its entirety. Filled flexible containers exit the arrangement at 158.

An object of the present application is an apparatus for the treatment of flexible, hose-like objects, in one possible embodiment bags 1. This apparatus has a framework 5 and at least one processing device 2 which acts on the object over a section 3 of a movement path 4. The present application teaches that an open space 11 is realized below the movement path 4 of the objects, at least in the vicinity of the section 3.

One feature or aspect of an embodiment is believed at the time if the filing of this patent application to possibly reside broadly in an apparatus for the treatment of flexible, hose-like objects, in one possible embodiment of bags 1, with a framework 5, with a guide track 6 that transports the objects over a movement path 4 and with at least one processing device 2 that acts on the objects over a section 3 of the movement path 4, wherein, underneath the movement path 4 of the objects, at least in the vicinity of the section 3, an open space 11 is realized such that the guide track 6 is located above the objects and their movement path 4.

One feature or aspect of an embodiment is believed at the time if the filing of this patent application to possibly reside broadly in an apparatus for the treatment of flexible, hose-like objects, in one possible embodiment of bags 1, with a framework 5 and with at least one processing device 2 which acts on the object over a section 3 of a movement path 4, wherein an open space 11 is realized underneath the movement path 4 of the objects, at least in the vicinity of the section 3.

Another feature or aspect of an embodiment is believed at the time if the filing of this patent application to possibly reside broadly in the apparatus, wherein the framework 5 is realized in the form of a bridge 5 that spans at least the section 3 and holds both the processing device 2 as well as a guide track 6 for the transport of the objects, and positions both the processing device 2 and the guide track 6 above the movement path 4 of the objects which is underneath.

Still another feature or aspect of an embodiment is believed at the time if the filing of this patent application to possibly reside broadly in the apparatus, wherein the bridge 5 rests on bases 7 which are positioned outside the section 3.

Yet another feature or aspect of an embodiment is believed at the time if the filing of this patent application to possibly reside broadly in the apparatus, wherein the bases 7 are components of a housing structure 5, 7, 8, 9 which spans the section 3.

A further feature or aspect of an embodiment is believed at the time if the filing of this patent application to possibly reside broadly in the apparatus, wherein the bridge 5 and the bases 7 run in a longitudinal direction L defined by the movement path 4.

Another feature or aspect of an embodiment is believed at the time if the filing of this patent application to possibly reside broadly in the apparatus, wherein the bases 7 are located on both sides of the movement path 4 at a specified longitudinal distance and/or transverse distance from one another.

Yet another feature or aspect of an embodiment is believed at the time if the filing of this patent application to possibly reside broadly in the apparatus, wherein the housing structure 5, 7, 8, 9 has essentially vertically oriented base pairs 8 of the bases 7 and the base pairs 8 each have horizontal struts 9 which connect them with each other.

Still another feature or aspect of an embodiment is believed at the time if the filing of this patent application to possibly reside broadly in the apparatus, wherein the bases 7 of the housing structure 5, 7, 8, 9 are connected to one other by the bridge which runs in the longitudinal direction L.

A further feature or aspect of an embodiment is believed at the time if the filing of this patent application to possibly reside broadly in the apparatus, wherein the guide track 6 has gripper pairs, each of which holds an object.

Another feature or aspect of an embodiment is believed at the time if the filing of this patent application to possibly reside broadly in the apparatus, wherein the objects are transported, at least in the vicinity of the section 3, along the movement path 4 suspended on the gripper pairs.

Yet another feature or aspect of an embodiment is believed at the time if the filing of this patent application to possibly reside broadly in the apparatus, wherein a collecting device 13 is provided underneath the open space 11.

Still another feature or aspect of an embodiment is believed at the time if the filing of this patent application to possibly reside broadly in the apparatus, wherein at least on one side next to the movement path there is a backsplash 14 which forms a closed surface.

An object of the present application is a device for the treatment of flexible, tubular structures with at least one opening, for example bags 101. This device is equipped with at least one gripper 103, 104 that holds the structure at its opening and that has at least one leading gripper 103 and one trailing gripper 104. According to the present application, the leading gripper 103 and the trailing gripper 104 are mounted on separate guide trains 105, 106 that can be moved relative to one another.

One feature or aspect of an embodiment is believed at the time of the filing of this patent application to possibly reside broadly in a device for the treatment of flexible, tubular structures, in one possible embodiment bags 101, with at least one gripper pair 103, 104 that holds the structure and comprising at least one leading gripper 103 and one trailing gripper 104, wherein the leading gripper 103 and the trailing gripper 104 are mounted on different guide trains 105, 106 that can be moved relative to one another.

Another feature or aspect of an embodiment is believed at the time of the filing of this patent application to possibly reside broadly in the device, wherein the two guide trains 105, 106 are each motor driven independently of the other.

Yet another feature or aspect of an embodiment is believed at the time of the filing of this patent application to possibly reside broadly in the device, wherein the two guide trains 105, 106 are each in the form of an endless loop.

Still another feature or aspect of an embodiment is believed at the time of the filing of this patent application to possibly reside broadly in the device, wherein the two guide trains 105, 106 are arranged at least in part one above the other when viewed from the side.

A further feature or aspect of an embodiment is believed at the time of the filing of this patent application to possibly reside broadly in the device, wherein the two guide trains 105, 106 each have one or more conveying devices, such as belts, chains, etc., to which the leading grippers 103 or trailing grippers 104 are mounted separately and independently.

Another feature or aspect of an embodiment is believed at the time of the filing of this patent application to possibly reside broadly in the device, wherein a path of motion defined by the two guide trains 105, 106 is linear at least over a segment T of defined length $L_1$.

Yet another feature or aspect of an embodiment is believed at the time of the filing of this patent application to possibly reside broadly in the device, wherein the guide trains 105, 106 can be displaced manually or by motor to vary a distance A between the grippers 103, 104 and/or a distance B between the gripper pairs 103, 104.

Still another feature or aspect of an embodiment is believed at the time of the filing of this patent application to possibly reside broadly in the device, wherein the grippers 103, 104 are non-permanently mounted on the guide trains 105, 106.

A further feature or aspect of an embodiment is believed at the time of the filing of this patent application to possibly reside broadly in the device, wherein the two grippers 103, 104 each extend from mounting plates 111, 112, which themselves are mounted on the guide trains 105, 106.

Another feature or aspect of an embodiment is believed at the time of the filing of this patent application to possibly reside broadly in the device, wherein the two grippers 103, 104 are arranged on a common processing side 113 relative to the path of motion defined by the guide trains 105, 106.

One feature or aspect of an embodiment is believed at the time of the filing of this patent application to possibly reside broadly in a device for the treatment of flexible, tubular structures, in one possible embodiment bags 101, with at least one gripper pair 103, 104 that holds the structure and that has at least one leading gripper 103 and one trailing gripper 104, whereby:
  the leading gripper 103 and the trailing gripper 104 are mounted on separate guide trains 105, 106 that can be moved relative to one another, further whereby
  the two guide trains 105, 106 are each motor-driven independently of one another, and whereby
  the guide trains 105, 106 can be displaced relative to one another by a motor to vary a distance A between the grippers 103, 104 and/or a distance B between the gripper pairs 103, 104, wherein
  with the help of a controller 109, the respective leading gripper 103 is shifted by a certain amount C in the direction of transport R and the respective trailing gripper 104 is shifted by the same amount C opposite the direction of transport R, so that
  the middle M of the bag remains in the same position even in the event of a bag change.

Another feature or aspect of an embodiment is believed at the time of the filing of this patent application to possibly reside broadly in the device, wherein the two guide trains 105, 106 are each in the form of an endless loop.

Yet another feature or aspect of an embodiment is believed at the time of the filing of this patent application to possibly reside broadly in the device, wherein the two guide trains 105, 106 are arranged in part one above the other when viewed from the side.

Still another feature or aspect of an embodiment is believed at the time of the filing of this patent application to possibly reside broadly in the device, wherein the two guide trains 105, 106 each have one or more conveying devices, such as belts, chains, etc., to which the leading grippers 103 or trailing grippers 104 are mounted separately and independently.

A further feature or aspect of an embodiment is believed at the time of the filing of this patent application to possibly reside broadly in the device, wherein a path of motion defined by the two guide trains 105, 106 is linear at least over a segment T of defined length $L_1$.

Another feature or aspect of an embodiment is believed at the time of the filing of this patent application to possibly reside broadly in the device, wherein the grippers 103, 104 are non-permanently mounted on the guide trains 105, 106.

Yet another feature or aspect of an embodiment is believed at the time of the filing of this patent application to possibly reside broadly in the device, wherein the two grippers 103, 104 each extend from mounting plates 111, 112, which themselves are mounted on the guide trains 105, 106.

Still another feature or aspect of an embodiment is believed at the time of the filing of this patent application to possibly reside broadly in the device, wherein the two grippers 103, 104 are arranged on a common processing side 113 relative to the path of motion defined by the guide trains 105, 106.

One feature or aspect of an embodiment is believed at the time of the filing of this patent application to possibly reside broadly in an apparatus for filling bags with food products such as pretzels, potato chips, jelly beans, and gummy bears, the apparatus comprising: an arrangement configured to open and dispose bags for gripping; at least one filling device configured to dispense filling materials through a lower opening therein; a first gripping arrangement configured to grip a first top edge portion of bags disposed by the opening and disposing arrangement; a second gripping arrangement configured to grip a second top edge portion substantially opposite a first top edge portion of bags disposed by the opening and disposing arrangement; at least one conveying arrangement configured to dispose the first and the second gripping arrangements proximate the lower opening of the at least one filling device; the at least one conveying arrangement comprising a linear path segment under the at least one filling device; at least one motor arrangement configured to move the at least one conveying arrangement; the first and the second gripping arrangements each comprising a portion extending below the at least one conveying arrangement and configured to dispose a bag opening below the at least one conveying arrangement to minimize accumulation of filling materials on the at least one conveying arrangement during filling of bags; a controller configured to operably move the first and the second gripping arrangements such the middle of bag openings are substantially under the at least one filling device as to minimize spilling of filling materials during filling; a frame configured to support the at least one filling device on a base comprising: an upper portion configured to support the at least one filling device, the lower opening of the at least one filling device being below the upper portion of the frame to minimize accumulation of filling materials on the frame during filling; at least three legs extending downward and outward from the upper portion a sufficient amount to minimize accumulation of filling materials on the frame during filling of bags; and the frame being configured to provide a space sufficient below the at least one filling device to allow entry of a cleaning apparatus for cleaning of the base below the at least one filling device.

Another feature or aspect of an embodiment is believed at the time of the filing of this patent application to possibly reside broadly in an apparatus for filling bags wherein the upper portion of the frame comprises a bridge that spans the linear path segment of the at least conveying device, the bridge holds the at least one filling device and the at least one conveying arrangement and positions the at least one filling device and the at least one conveying arrangement above portions of the first and the second gripping arrangements configured to grip bags.

Yet another feature or aspect of an embodiment is believed at the time of the filing of this patent application to possibly reside broadly in an apparatus for filling bags wherein the bridge rests on vertically extending bases positioned outside of the linear path segment of the at least one conveying arrangement, the bases being configured to support the apparatus for filling bags on a floor area.

Still another feature or aspect of an embodiment is believed at the time of the filing of this patent application to possibly reside broadly in an apparatus for filling bags comprising: at least one filling device configured to dispense filling materials through a lower opening therein; an arrangement configured to dispose bags with an opening below the lower opening of the at least one filling device; the bag disposing arrangement comprises at least one downward extending portion configured to dispose a bag opening substantially below the bag disposing arrangement to minimize accumulation of filling materials on the bag disposing arrangement during filling of bags; a frame configured to support the at least one filling device on a floor area comprising: an upper portion configured to support the at least one filling device, the lower opening of the at least one filling device being below the upper portion of the frame to minimize accumulation of filling materials on the frame during filling; at least two legs extending downward and outward from the upper portion a sufficient amount to minimize accumulation of filling materials on the frame during filling of bags; and the frame being configured to provide a space sufficient below the at least one filling device to allow entry of a cleaning apparatus for cleaning of a floor area below the at least one filling device.

A further feature or aspect of an embodiment is believed at the time of the filing of this patent application to possibly reside broadly in an apparatus for filling bags wherein the upper portion of the frame comprises a bridge that spans at least a portion of the disposing arrangement proximate the at least on filling device, the bridge holds the at least one filling device and the disposing arrangement and positions the at least one filling device above the downward extending portion of the disposing arrangement configured to dispose bags.

Another feature or aspect of an embodiment is believed at the time of the filing of this patent application to possibly reside broadly in an apparatus for filling bags wherein the bridge rests on vertically extending bases positioned outside of the at least one filling device, the bases being configured to support the apparatus for filling bags on a floor area.

Yet another feature or aspect of an embodiment is believed at the time of the filing of this patent application to possibly reside broadly in an apparatus for filling bags wherein the bases are located on both sides of the at least one filling device.

Still another feature or aspect of an embodiment is believed at the time of the filing of this patent application to possibly reside broadly in an apparatus for filling bags wherein the vertically extending bases comprise a plurality of base pairs, each of the base pairs comprising a base vertically extending on each side of the at least one filling device from the upper portion of the frame, the upper portion of the frame comprising horizontal struts connecting each base of the base pairs.

A further feature or aspect of an embodiment is believed at the time of the filing of this patent application to possibly reside broadly in an apparatus for filling bags wherein the at least one downward extending portion of the disposing arrangement comprises gripper pairs configured to dispose a bag opening.

Another feature or aspect of an embodiment is believed at the time of the filing of this patent application to possibly reside broadly in an apparatus for filling bags further comprising a backsplash with a substantially closed surface and a substantially vertical component proximate the lower openings of the at least one filling device.

Yet another feature or aspect of an embodiment is believed at the time of the filing of this patent application to possibly reside broadly in an apparatus for filling bags further comprising a collecting device with a substantially closed surface below the lower openings of the at least one filling device.

Still another feature or aspect of an embodiment is believed at the time of the filing of this patent application to possibly reside broadly in an apparatus for filling bags comprising: at least one filling device configured to dispense filling materials through a lower opening therein; an arrangement configured to convey and dispose bags with an opening below the lower opening of the at least one filling device; at least one motor arrangement configured to move the at least one conveying arrangement over a movement path; a frame configured to support the at least one filling device and the at least one conveying arrangement and provide a space underneath the movement path of the at least one conveying device, at least under the at least one filling device, such that the at least one conveying device is configured to be disposed substantially above bag openings of bags disposed therewith.

A further feature or aspect of an embodiment is believed at the time of the filing of this patent application to possibly reside broadly in an apparatus for filling bags wherein the frame is configured to provide a space sufficient below the at least one filling device to allow entry of a cleaning apparatus for cleaning of a floor area below the at least one filling device.

Another feature or aspect of an embodiment is believed at the time of the filing of this patent application to possibly reside broadly in an apparatus for filling bags wherein the frame comprises a bridge that spans at least a portion of the conveying arrangement proximate the at least on filling device, the bridge holds the at least one filling device and the conveying arrangement and positions the at least one filling device above the downward extending portion of the conveying arrangement configured to dispose bags.

Yet another feature or aspect of an embodiment is believed at the time of the filing of this patent application to possibly reside broadly in an apparatus for filling bags wherein the bridge rests on vertically extending bases positioned outside of the at least one filling device, the bases being configured to support the apparatus for filling bags on a floor area.

Still another feature or aspect of an embodiment is believed at the time of the filing of this patent application to possibly reside broadly in an apparatus for filling bags wherein the bases are located on both sides of the at least one filling device.

A further feature or aspect of an embodiment is believed at the time of the filing of this patent application to possibly reside broadly in an apparatus for filling bags wherein the vertically extending bases comprise a plurality of base pairs, each of the base pairs comprising a base vertically extending on each side of the at least one filling device from the bridge, the bridge comprising horizontal struts connecting each base of the base pairs.

Another feature or aspect of an embodiment is believed at the time of the filing of this patent application to possibly reside broadly in an apparatus for filling bags wherein the conveying arrangement comprises grippers configured to dispose a bag opening.

Yet another feature or aspect of an embodiment is believed at the time of the filing of this patent application to possibly reside broadly in an apparatus for filling bags further comprising a backsplash with a substantially closed surface and a substantially vertical component proximate the lower openings of the at least one filling device.

Still another feature or aspect of an embodiment is believed at the time of the filing of this patent application to possibly reside broadly in an apparatus for filling bags further comprising a collecting device with a substantially closed surface below the lower openings of the at least one filling device.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following patents, patent applications or patent publications, are hereby incorporated by reference as if set forth in their entirety herein: U.S. Pat. No. 5,862,653, having the title "FLEXIBLE PACKAGE HANDLING DEVICE," published on Jan. 26, 1999; EP 0 765 807, having the title "MANIPULATOR DEVICE FOR HANDLING FLEXIBLE BAGS," published on Apr. 2, 1997; and DE 697 00 644 T2, having the following English translation of the German title "SEALING MACHINE AND METHOD," published on Feb. 10, 2000; EP 0 999 137 A2, having the title "POUCH CARRYING APPARATUS," published on May 10, 2000; U.S. Pat. No. 5,862,653, having the title "FLEXIBLE PACKAGE HANDLING DEVICE," published on Jan. 26, 1999; EP 0999137, having the title "POUCH CARRYING APPARATUS," published on May 10, 2000; and U.S. Pat. No. 6,276,117, having the title "ADJUSTABLE POUCH CARRIER FOR DIFFERENT SIZE POUCHES IN A PACKAGING MACHINE HAVING AN ADJUSTABLE POUCH CARRIER," published on Aug. 21, 2001.

All of the patents, patent applications or patent publications, which were cited in the German Office Action dated Mar. 8, 2007, and/or cited elsewhere are hereby incorporated by reference as if set forth in their entirety herein as follows: EP 0999137, having the title "POUCH CARRYING APPARATUS," published on May 10, 2000; U.S. Pat. No. 6,276,117, having the title "ADJUSTABLE POUCH CARRIER FOR DIFFERENT SIZE POUCHES AND PACKAGING MACHINE HAVING AN ADJUSTABLE POUCH CARRIER," published on Aug. 21, 2001; EP 1167210, having the title "CONTINUOUS CONTAINER-SUPPLYING APPARATUS," published on Jan. 2, 2002; U.S. Pat. No. 5,058,364, having the title "PACKAGING MACHINE ADAPTED TO CONVERT POUCHES FROM EDGEWISE ADVANCE TO BROADWISE ADVANCE," published on Oct. 22, 1991; and DE 197 44 899, having the following English translation of the German title "APPARATUS FOR TREATING FLEXIBLE BAGS," published on Apr. 15, 1999.

Some examples of apparatuses for opening and disposing bags and of gripping arrangements that may possibly be utilized or adapted for use in at least one possible embodiment may possibly be found in the following U.S. patents: U.S. Pat. No. 4,108,300, having the title "BAG PACKING APPARATUS", issued on Aug. 22, 1978; and U.S. Pat. No. 6,276,117, having the title "ADJUSTABLE POUCH CARRIER FOR DIFFERENT SIZE POUCHES AND PACKAGING MACHINE HAVING AN ADJUSTABLE POUCH CARRIER", issued on Aug. 21, 2001.

Some examples of apparatuses for closing arrangements that may possibly be utilized or adapted for use in at least one possible embodiment may possibly be found in United States Patent Publication 2007/0101684, having the title "DEVICE FOR THE PRODUCTION OF TUBULAR BAGS", published on May 10, 2007.

All of the patents, patent applications or patent publications, which were cited in the International Search Report dated Sep. 18, 2007, and/or cited elsewhere are hereby incorporated by reference as if set forth in their entirety herein as follows: GB 1,253,311, having the title "PROCESS AND APPARATUS FOR PRODUCTION OF A CONTAINER," published on Nov. 10, 1971; and EP 0492140, having the following English translation of the German title "DEEP DRAWING MACHINE FOR MAKING, FILLING AND CLOSING CONTAINERS FROM A THERMOPLASTIC WEB INTERMITTENTLY FED BY A CONVEYOR," published on Jul. 1, 1992.

All of the patents, patent applications or patent publications, which were cited in the German Office Action dated Nov. 23, 2006, and/or cited elsewhere are hereby incorporated by reference as if set forth in their entirety herein as follows: EP 0765807, having the title "MANIPULATOR DEVICE FOR HANDLING FLEXIBLE BAGS," published on Apr. 2, 1997; to U.S. Pat. No. 5,862,653, having the title "FLEXIBLE PACKAGE HANDLING DEVICE," published on Jan. 26, 1999; DE 697 00 644, having the following English translation of the German title "SEALING MACHINE AND METHOD," published on Feb. 10, 2000; DE 19 15 555 having the following German title "VORRICHTUNG ZUM FOLLEN VON VERPACKUNGSBEHALTERN MIT SCHOTTBAREM GUT," published on Oct. 8, 1970; and DE 198 59 060, having the following German title "VORRICHTUNG ZUM STEUERN DES ARBEITSABLAUFES EINER ARBEITSMASCHINE," published on Jun. 24, 1971.

The patents, patent applications, and patent publications listed above, beginning on line 1184 on page 57 in the paragraph with the statement: "The following patents, patent applications or patent publications, are hereby incorporated by reference as if set forth in their entirety herein: U.S. Pat. No. 5,862,653 . . . " and ending on line 1254 on page 60 in the paragraph with the phrase: " . . . published on Jun. 24, 1971," are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 030 255.9, filed on Jun. 30, 2006, having inventor Thomas MATHEYKA, and DE-OS 10 2006 030 255.9 and DE-PS 10 2006 030 255.9, and International Application No. PCT/EP2007/005402, filed on Jun. 20, 2007, having WIPO Publication No. WO 2008/000376 and inventor Thomas MATHEYKA, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/005402 and German Patent Application No. 10 2006 030 255.9 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/005402 and DE 10 2006 030 255.9 from which this patent application claims priority which do not have to do with the correction of the translation in this patent application are not to be included in this patent application in the incorporation by reference.

U.S. patent application Ser. No. 12/341,564, filed on Dec. 22, 2008, and corresponding foreign and international patent publication applications, namely, Federal Republic of Germany Patent Application No. 10 2006 028 796.7, filed on Jun. 23, 2006, having inventor Thomas MATHEYKA, and DE-OS10 2006 028 796.7 and DE-PS 10 2006 028 796.7, and International Application No. PCT/EP2007/005399, filed on Jun. 20, 2007, having WIPO Publication No. WO 2007/147566 and inventor Thomas MATHEYKA, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/005399 and German Patent Application No. 10 2006 028 796.7 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/005399 and DE 10 2006 028 796.7 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. An apparatus for treating flexible containers comprising:
a framework and a guide track configured to transport flexible containers over a movement path;
at least one processing device configured to treat flexible containers as said flexible containers are moved on said guide track over a section of said movement path;
said framework comprising a bridge, which bridge extends over at least said section and supports both said at least one processing device and said guide track above the flexible containers and an open space thereunder during treatment of the flexible containers;
said apparatus comprises a backsplash disposed at least on one side next to the movement path and configured to block dispensed material from contacting a base of said framework; and
said backsplash is oriented vertically and extends a substantial distance above and a substantial distance below said guide track.

2. An apparatus for treating flexible containers comprising:
a framework and a guide track configured to transport flexible containers over a movement path;
at least one processing device configured to treat flexible containers as said flexible containers are moved on said guide track over a section of said movement path;
said framework comprising a bridge, which bridge extends over at least said section and supports both said at least one processing device and said guide track above the flexible containers and an open space thereunder during treatment of the flexible containers;
the apparatus is configured to fill bags with a material, said at least one processing device comprises at least one filling device, and said section of said movement path comprises a filling section;
said at least one filling device is configured to fill bags with a liquid;
said apparatus comprises a backsplash disposed at least on one side next to the movement path and configured to block dispensed material from contacting a base of said framework; and
said backsplash is oriented vertically and extends a substantial distance above and a substantial distance below said guide track.

3. An apparatus for treating flexible containers comprising:
a framework and a guide track configured to transport flexible containers over a movement path;
at least one processing device configured to treat flexible containers as said flexible containers are moved on said guide track over a section of said movement path;
said framework comprising a bridge, which bridge extends over at least said section and supports both said at least one processing device and said guide track above the flexible containers and an open space thereunder during treatment of the flexible containers;
said apparatus comprises a collecting device disposed underneath the open space and configured to collect spilled dispensed material; and
said collecting device is pivotably mounted on said framework and is configured to be pivoted out of its collecting position to permit cleaning thereof.

4. An apparatus for treating flexible containers comprising:
a framework and a guide track configured to transport flexible containers over a movement path;
at least one processing device configured to treat flexible containers as said flexible containers are moved on said guide track over a section of said movement path;

said framework comprising a bridge, which bridge extends over at least said section and supports both said at least one processing device and said guide track above the flexible containers and an open space thereunder during treatment of the flexible containers;
said framework comprises bases disposed away from said section and configured to support said bridge;
each of said bases comprises a vertical portion, a horizontal portion, and an angled portion which connects said vertical portion and said horizontal portion;
said vertical portion is substantially perpendicular to said horizontal portion;
said angled portion is at an obtuse angle to each of said horizontal portion and said vertical portion; and
said horizontal portion connects said angled portion to said bridge.

\* \* \* \* \*